June 14, 1960

N. J. HARRICK 2,941,092

PULSE DELAY CIRCUIT

Filed Oct. 25, 1955

INVENTOR
NICOLAS J. HARRICK
BY Fred M. Vogel
AGENT 2,941,092
Patented June 14, 1960

2,941,092

PULSE DELAY CIRCUIT

Nicolas J. Harrick, North Tarrytown, N.Y., assignor to North American Philips Company, Inc.

Filed Oct. 25, 1955, Ser. No. 542,657
12 Claims. (Cl. 307—88.5)

The present invention concerns pulse delay circuits of the type utilizing semiconductor signal translating devices with controlled carrier transit times. More particularly, the present invention concerns multipulse delay circuits of the type utilizing semiconductor signal translating devices with controlled carrier transit times.

The principal object of the present invention is the provision of a multipulse delay circuit utilizing a semiconductor signal translating device.

An object of the present invention is the provision of a multipulse delay circuit utilizing a semiconductor signal translating device which produces a pulse of suitably high amplitude.

Another object of the present invention is the provision of a multipulse delay circuit utilizing a semiconductor signal translating device having independently controlled amplitude and delay time.

A further object of the present invention is the provision of a multipulse delay circuit of compact nature and efficient operation.

Figure 1:
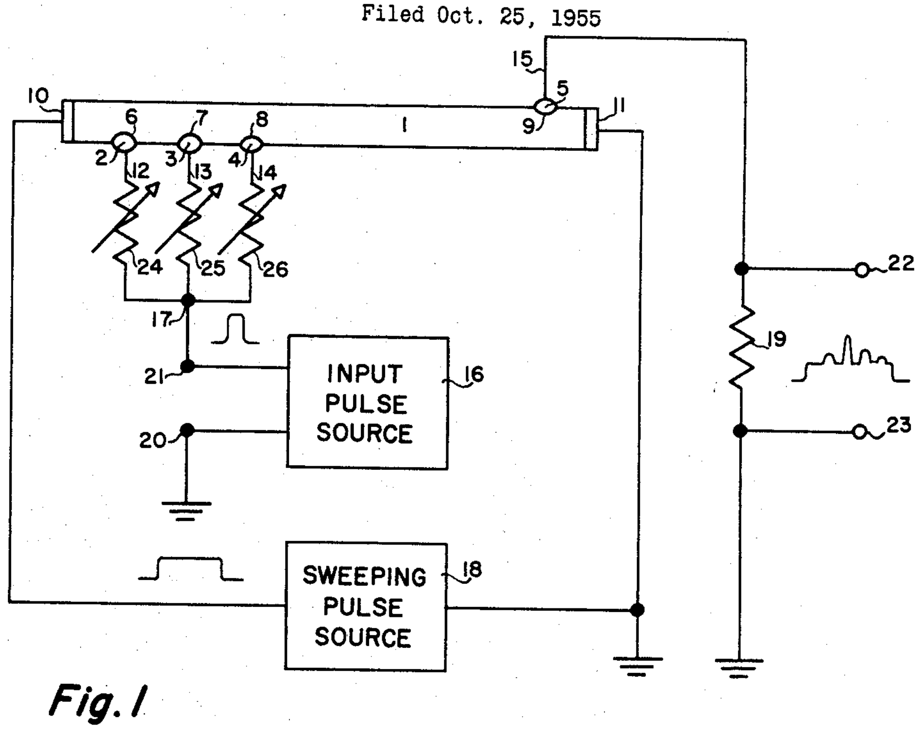
Figure 2:
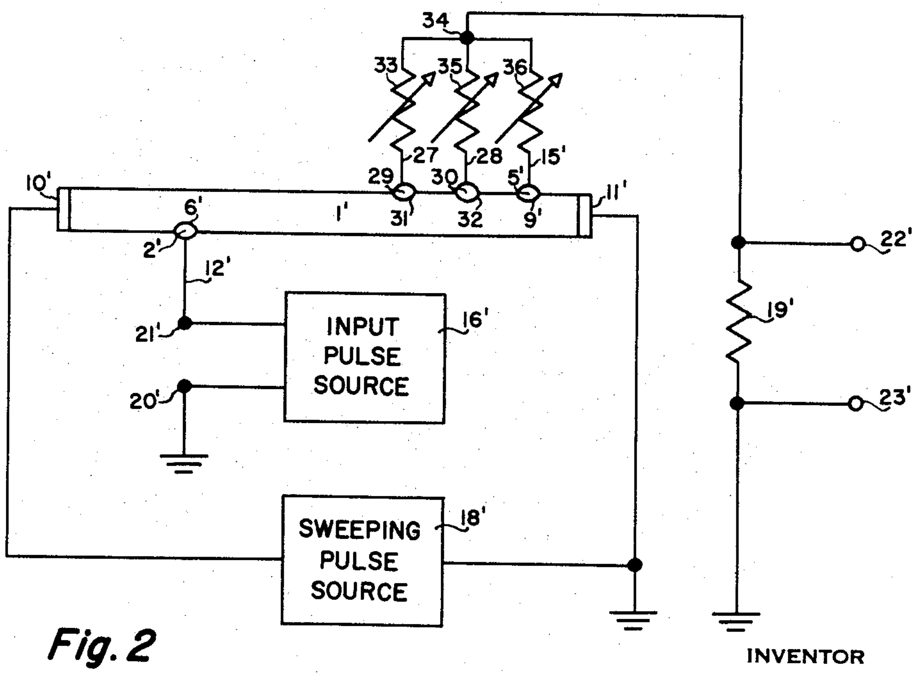

These and other objects and features of the invention will be apparent from a consideration of the following detailed description taken in connection with the accompanying drawing, wherein:

Fig. 1 is a schematic diagram of a preferred embodiment of the pulse delay circuit of the present invention; and Fig. 2 is a schematic diagram of another embodiment of the pulse delay circuit of the present invention.

In Fig. 1 the translating device comprises an elongated body 1 of semiconductive material of one conductivity type and having therein a plurality of zones or islands 2, 3, 4 and 5 of material of opposite conductivity type, each zone forming a PN junction or barrier 6, 7, 8 and 9, respectively, with the body. The body 1 may be, for example, of N conductivity type germanium produced by adding thereto minute impurity levels of antimony, arsenic, bismuth, or the like, in a manner well known in the art. The zones 2, 3, 4 and 5 and the junctions 6, 7, 8 and 9 may be produced by alloying the body 1 at suitable points with suitable metals such as indium, gallium, or the like, in a manner well known in the art. Said zones preferably protrude from said body, although they may be flush with the surfaces thereof. The body 1 has low resistance terminals 10 and 11 at its opposite ends, termed the base electrodes, which may be, for example, coatings of rhodium on said body.

A plurality of contacts 12, 13 and 14 bear against the zones 2, 3 and 4, respectively, on one surface of the body 1. Said contacts may, for instance, be soldered to said zones to keep them from slipping. A contact 15 bears against the zone 5 on the opposite surface of the body 1. Said contacts may be, for example, of nickel or copper. The contacts 12, 13 and 14 function as emitter electrodes and are biased in the forward direction by an input pulse source 16 which is connected between a common junction 17 of said emitter electrodes and ground. The input pulse source 16 is conventional in form and may consist, for example, of a multivibrator, the pulses of which are to be delayed. The contact 15 functions as a collector electrode and is biased in the reverse direction by a sweeping pulse source 18 which is connected in series with the base electrodes 10 and 11; the primary purpose of the source 18 being to sweep carriers through the body 1. The pulse source 18 may be conventional in form and may consist of a well known multivibrator, the constants of which are appropriately selected so that the occurrence of the pulse occurs at least immediately prior to the occurrence of the pulse from the source 16 and the duration is at least equal to the desired delay period of the pulses. Preferably, the sources 16 and 18 may be synchronized in a well known manner by a suitable interconnection so that they operate in the desired synchronism.

The series connection of the source 18 and the base electrodes 10 and 11 is grounded between the source 18 and the base electrode 11. The collector electrode 15 is grounded through a load resistor 19, across which the desired delayed output pulses are produced. The input pulse source 16 feeds a pulse to the emitter electrodes through input terminals 20 and 21. The output pulses are removed through output terminals 22 and 23 across the load resistor 19.

A variable input impedance such as a variable resistor 24 is connected in series in the circuit of the emitter electrode 12 between said emitter electrode and the common junction 17; a variable input impedance 25 is connected in series in the circuit of the emitter electrode 13 between said emitter electrode and the common junction 17; and a variable input impedance 26 is connected in series in the circuit of the emitter electrode 14 between said emitter electrode and the common junction 17. Of the impedances 24, 25 and 26, the impedance of 24 is preferably the smallest, relatively, the impedance of 25 is larger, relatively, than that of 24, and the impedance of 26 is the largest, relatively.

The output voltage produced at the output terminals 22 and 23 is a series of pulses superimposed upon the pulse provided by the sweeping pulse source 18. The series of superimposed output pulses correspond to the input pulses provided by the input pulse source 16. The relative amplitudes of the pulses of said series may be adjusted by adjusting the input impedances 24, 25 and 26 of the emitter electrodes 12, 13 and 14, respectively; each pulse of said series corresponding to one of said emitter electrodes. The time delay between adjacent pulses of said series varies with the relative spacing of the corresponding emitter electrodes and the collector electrode 15; said time delay tending to increase as said spacing is increased.

Fig. 2 is a schematic diagram of another embodiment of the pulse delay circuit of the present invention. Fig. 2 is similar to Fig. 1 except for the number of emitter and collector electrodes. In Fig. 2, semiconductor body 1′, zones 2′ and 5′, PN junctions 6′ and 9′, end terminals 10′ and 11′, point contacts 12′ and 15′, input pulse source 16′, sweeping pulse source 18′, load resistor 19′, input terminals 20′ and 21′, and output terminals 22′ and 23′, all correspond with, are connected as, and operate together as their counterparts of Fig. 1.

In the embodimeent of Fig. 2, however, a plurality of collector electrodes is connected through a common junction to ground through the load resistor 19′ and only a single emitter electrode is provided. Contacts 27, 28 and 15′ comprise the collector eelectrodes and contact opposite conductivity zones 29, 30 and 5′, respectively, which form PN junctions or barriers 31, 32 and 9′, respectively, with body 1′.

A variable input impedance 33 is connected in series in the circuit of the collector electrode 27 between said collector and a common junction 34; a variable input impedance 35 is connected in series in the circuit of the collector electrode 28 between said collector and the common junction 34; and a variable input impedance 36 is connected in series in the circuit of the collector electrode 15' between said collector electrode and the common junction 34.

Of the impedances 33, 35 and 36, the impedance 33 is preferably the largest, relatively, the impedance of 35 is smaller, relatively, than that of 33, and the impedance of 36 is the smallest, relatively.

The output voltage produced at the output terminals 22' and 23' is a series of pulses superimposed upon the pulse provided by the sweeping pulse source 18'. The series of superimposed output pulses correspond to the input pulses provided by the input pulse source 16'. The relative amplitudes of the pulses of said series vary with the input impedances 33, 35 and 36 of the collector electrodes 27, 28 and 15', respectively; each pulse of said series corresponding to one of said collector electrodes. The time delay between adjacent pulses of said series varies with the relative spacing of the corresponding collector electrodes and the emitter electrode 12'; said time delay tending to increase as said spacing is increased.

The use of alloyed junctions rather than point contacts with the body 1, permits the amplitudes of the series of output pulses to be high enough for practical purposes. Point contacts are found to produce output pulses which are too small in amplitude for practical purposes. For higher output pulse amplitudes a transverse magnetic field may be utilized due to the resultant concentration of carriers in the vicinity of the collector electrode and due to the guiding of carriers through the bulk of the body 1 to thereby reduce the effects of surface recombination.

The sweeping pulse source 18 is utilized to avoid the adverse heating effects that a continuous D.C. would have on the body 1.

In the embodiments of Figs. 1 and 2, the body 1 was selected of N conductivity type material such as germanium and the zones 2, 3, 4 and 5, and 2', 29, 30 and 5' were selected of P conductivity type material such as indium. It is obvious that a body of P conductivity type material may be utilized with zones of N conductivity material if the bias source polarities are suitably changed in a manner known in the art.

It is to be understood that the invention is not limited to the details disclosed but includes all such variations and modifications as fall within the spirit of the invention and the scope of the appended claims.

Having thus set forth the nature of my invention, what I claim is:

1. A pulse delay circuit including a signal translation device comprising an elongated body of semiconductive material of predetermined conductivity type having opposite end portions and surface portions between said end portions, a plurality of zones of material of opposite conductivity type spaced apart and arranged on said surface portions, first electrode means in contact with two of said zones, second electrode means in contact with one of said zones spaced from said two zones, and a pair of base electrodes in low resistance contact with said opposite end portions, a first pulse signal source connected to one of said electrode means, a second pulse signal source connected to said base electrodes, and output pulse deriving means connected to the other of said electrode means providing an ouput signal comprising a series of pulses corresponding to the pulses provided by said first pulse signal source superimposed upon the pulse provided by said second pulse signal source, the time of occurrence of each pulse of said series of pulses after the initial pulse produced by said first pulse signal source varying in accordance with the relative spacing of said first and second electrode means.

2. A pulse delay circuit as claimed in claim 1, further including means connected to one of said electrode means for varying the amplitude of the output signal pulses, and wherein the pulses of said series of pulses have relative amplitudes determined by the said amplitude varying means.

3. A pulse delay circuit as claimed in claim 2, wherein said amplitude varying means comprises variable impedance means.

4. A pulse delay circuit including a signal translation device comprising an elongated body of semiconductive material of predetermined conductivity type having opposite end portions and surface portions between said end portions, a plurality of zones of material of opposite conductivity type spaced apart and arranged on said surface portions, first electrode means in contact with at least two of said zones, second electrode means in contact with one of said zones spaced apart from said first-mentioned zones, and a pair of base electrodes in low resistance contact with said opposite end portions, a first pulse signal source connected to said first electrode means, a second pulse signal source connected to said base electrodes, and output pulse deriving means connected to said second electrode means providing an output signal comprising a series of pulses corresponding to the pulses provided by said first pulse signal source superimposed upon the pulse provided by said second pulse signal source, the time of occurrence of each pulse of said series of pulses after the initial pulse produced by the said first pulse signal source varying in accordance with the relative spacing of said first and second electrode means.

5. A pulse delay circuit as claimed in claim 4, further comprising means interposed between said first pulse signal source and said first electrode means for varying the amplitude of the output pulses provided by the said first pulse signal source, and wherein the pulses of said series of pulses have relative amplitudes determined by the said amplitude varying means.

6. A pulse delay circuit as claimed in claim 5, wherein said amplitude varying means comprises variable impedance means.

7. A pulse delay circuit including a signal translation device comprising an elongated body of semiconductive material of predetermined conductivity type having opposite end portions and surface portions between said end portions, a plurality of zones of material of opposite conductivity type spaced apart and arranged on said surface portions, first electrode means in contact with one of said zones, second electrode means in contact with at least two of said zones spaced apart from said first-mentioned zone, and a pair of base electrodes in low resistance contact with said opposite end portions, a first pulse signal source connected to said first electrode means, a second pulse signal source connected to said base electrodes, and output pulse deriving means connected to said second electrode means providing an output signal comprising a series of pulses corresponding to the pulses provided by said first pulse signal source superimposed upon the pulse provided by said second pulse signal source, the time of occurrence of each pulse of said series of pulses after the initial pulse produced by the said first pulse signal source varying in accordance with the relative spacing of said first and second electrode means.

8. A pulse delay circuit as claimed in claim 7, further comprising means interposed between said second electrode means and said output pulse deriving means for varying the amplitude of the output signal pulses, and wherein the pulses of said series of pulses have relative amplitudes determined by the said amplitude varying means.

9. A pulse delay circuit as claimed in claim 8, wherein said amplitude varying means comprises variable impedance means.

10. A pulse delay circuit including a signal translation device comprising an elongated body of semiconductive material of predetermined conductivity type having opposite end portions and surface portions between said end portions, a plurality of zones of material of opposite conductivity type spaced apart and arranged on said surface portions, first electrode means in contact with at least two of said zones, second electrode means in contact with one of said zones spaced apart from said first-mentioned zones, and a pair of base electrodes in low resistance contact with said opposite end portions, a first pulse signal source connected to said first electrode means, a second signal source connected to said base electrodes, and output pulse deriving means connected to said second electrode means providing an output signal comprising a series of pulses corresponding to the pulses provided by said first pulse signal source superimposed upon the signal provided by said second signal source, the time of occurrence of each pulse of said series of pulses after the initial pulse produced by the said first pulse signal source varying in accordance with the relative spacing of said first and second electrode means.

11. A pulse delay circuit as claimed in claim 10, further comprising means interposed between said first pulse signal source and said first electrode means for varying the amplitude of the output pulses provided by the said first pulse signal source, and wherein the pulses of said series of pulses have relative amplitudes determined by the said amplitude varying means.

12. A pulse delay circuit as claimed in claim 11, wherein said amplitude varying means comprises variable impedance means.

References Cited in the file of this patent

UNITED STATES PATENTS

| | | |
|---|---|---|
| 2,476,323 | Rack | July 19, 1949 |
| 2,600,500 | Haynes et al. | June 17, 1952 |
| 2,655,607 | Reeves | Oct. 13, 1953 |
| 2,701,302 | Giacoletto | Feb. 1, 1955 |
| 2,702,838 | Haynes | Feb. 22, 1955 |
| 2,761,020 | Shockley | Aug. 28, 1956 |
| 2,769,926 | Lesk | Nov. 6, 1956 |
| 2,801,348 | Pankove | July 30, 1957 |
| 2,832,898 | Camp | Apr. 29, 1958 |